C. GUTBERLET.
CUTTING AND FOLDING MACHINE.
APPLICATION FILED DEC. 4, 1916.

1,337,900.

Patented Apr. 20, 1920.
7 SHEETS—SHEET 1.

Charles Gutberlet
Inventor per
Mark W. Collet
Attorney.

C. GUTBERLET.
CUTTING AND FOLDING MACHINE.
APPLICATION FILED DEC. 4, 1916.
1,337,900.
Patented Apr. 20, 1920.
7 SHEETS—SHEET 2.
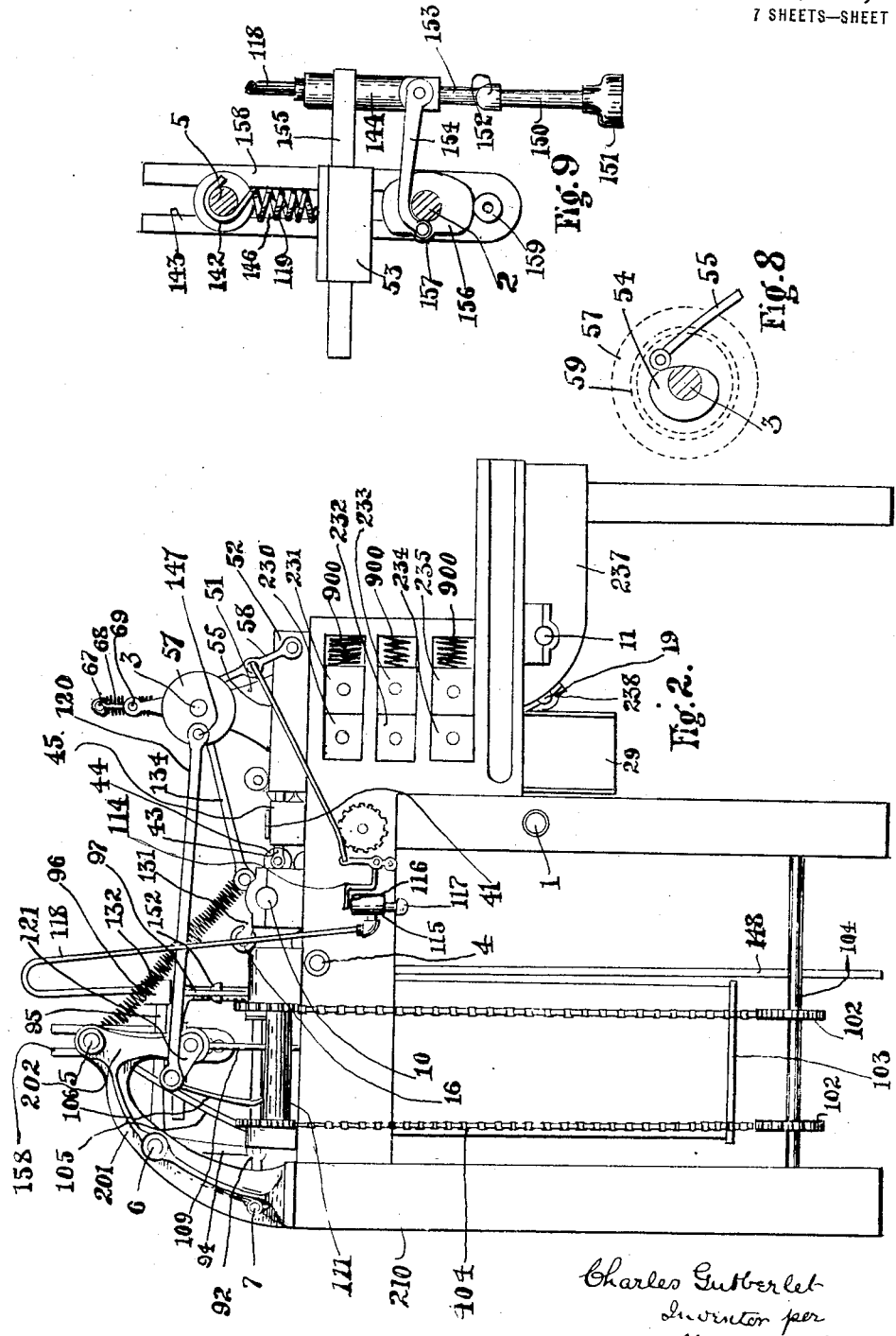

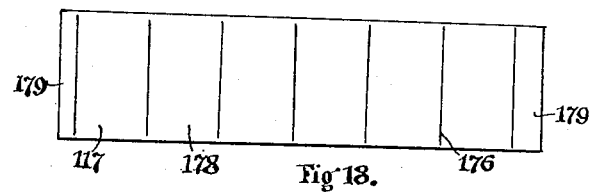
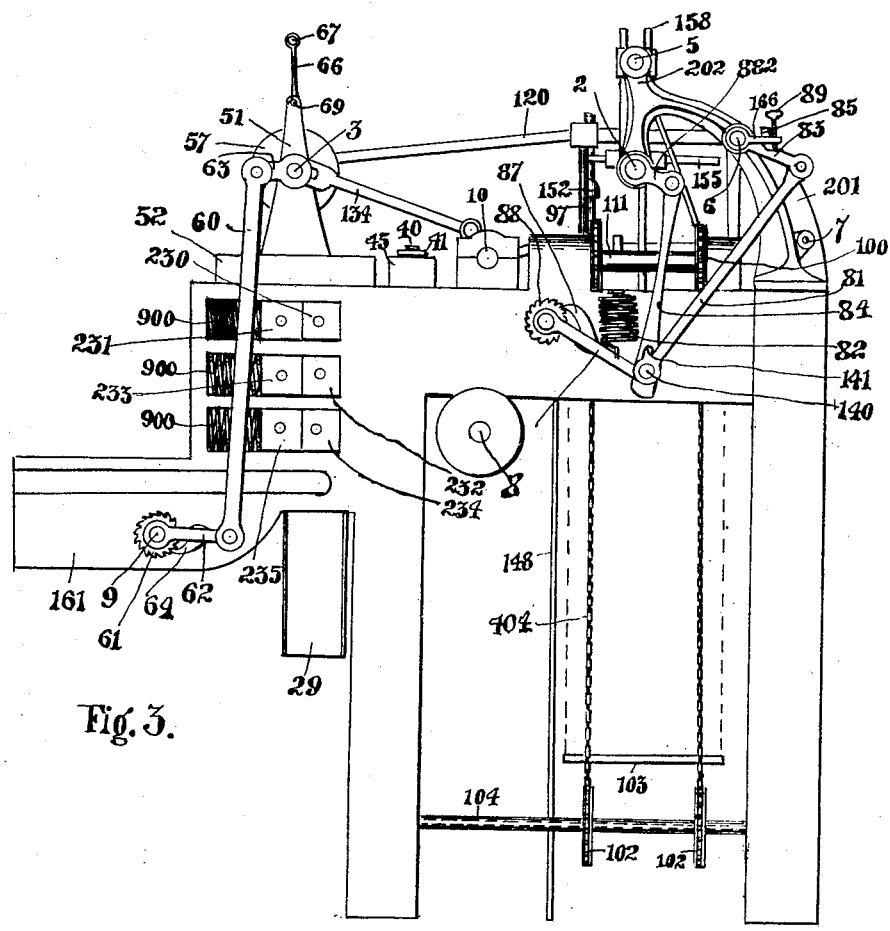

C. GUTBERLET.
CUTTING AND FOLDING MACHINE.
APPLICATION FILED DEC. 4, 1916.

1,337,900.

Patented Apr. 20, 1920.
7 SHEETS—SHEET 4.

Charles Gutberlet
Inventor
by his Atty. Mark W. Collet.

C. GUTBERLET.
CUTTING AND FOLDING MACHINE.
APPLICATION FILED DEC. 4, 1916.
1,337,900.
Patented Apr. 20, 1920.
7 SHEETS—SHEET 5.
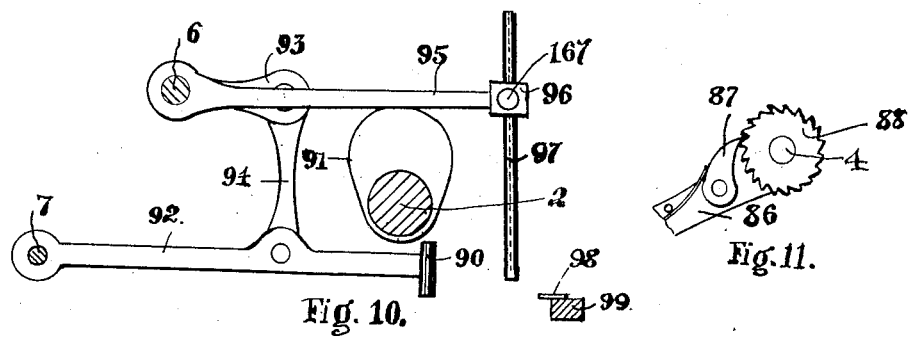
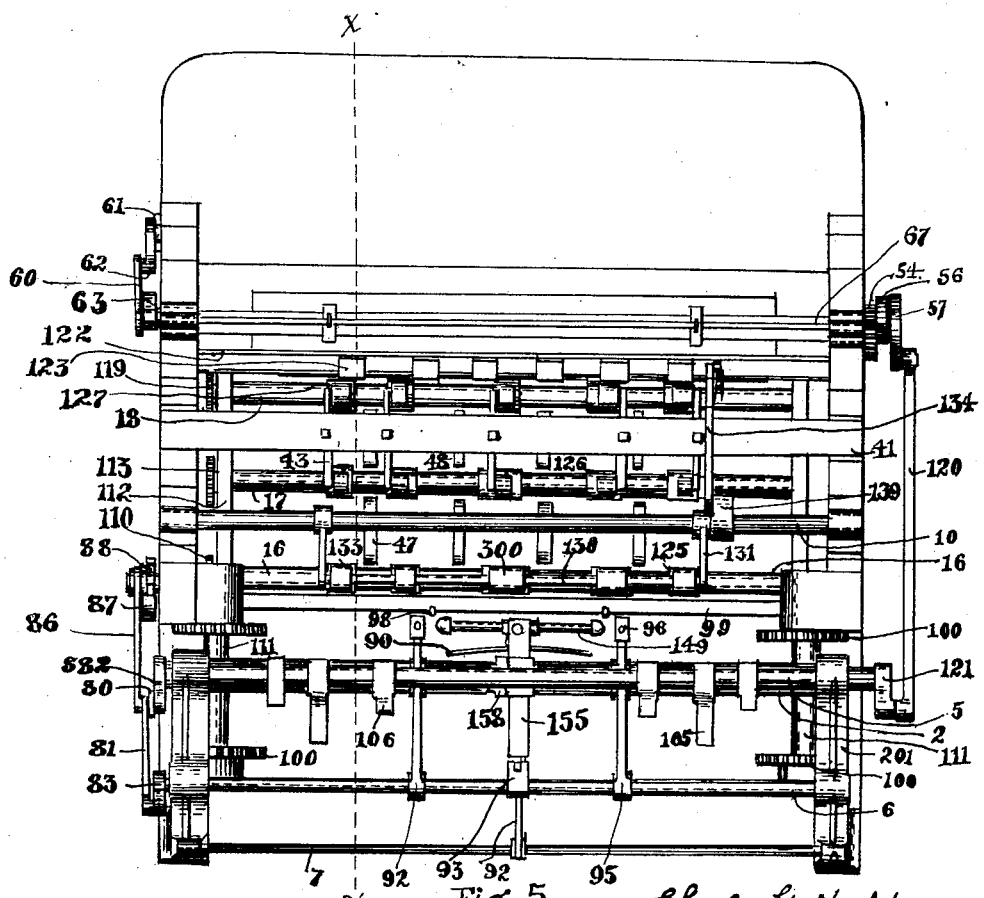

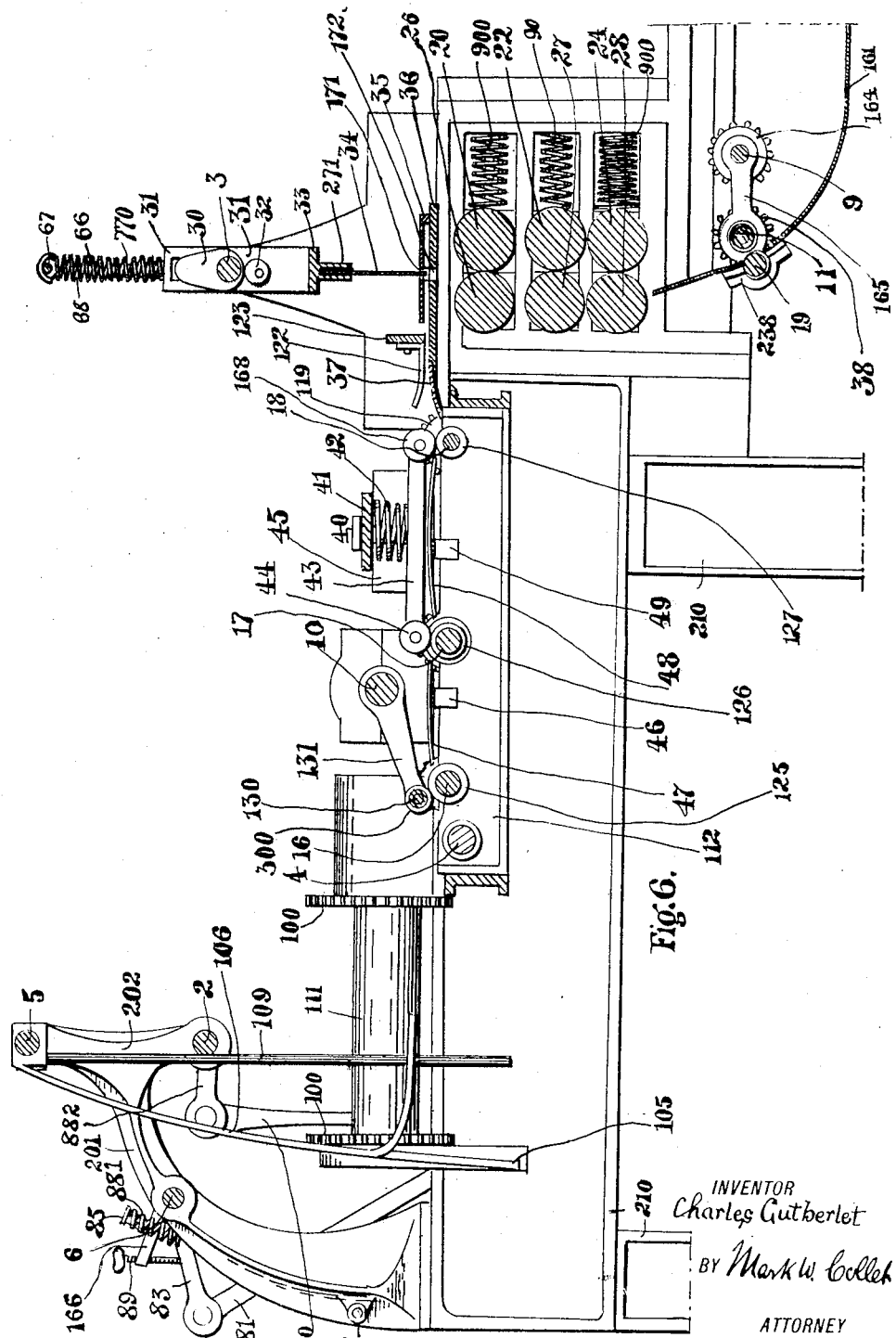

C. GUTBERLET.
CUTTING AND FOLDING MACHINE.
APPLICATION FILED DEC. 4, 1916.

1,337,900.  
Patented Apr. 20, 1920.  
7 SHEETS—SHEET 7.

INVENTOR  
Charles Gutberlet  
BY Mark W. Colleh  
ATTORNEY

UNITED STATES PATENT OFFICE.

CHARLES GUTBERLET, OF PHILADELPHIA, PENNSYLVANIA.

CUTTING AND FOLDING MACHINE.

1,337,900.

Specification of Letters Patent.

Patented Apr. 20, 1920.

Application filed December 4, 1916. Serial No. 135,061.

*To all whom it may concern:*

Be it known that I, CHARLES GUTBERLET, a citizen of the United States, residing at Philadelphia, in the county of Philadelphia and State of Pennsylvania, have invented certain new and useful Improvements in Cutting and Folding Machines, of which the following is a specification.

This machine belongs to the class of folding and cutting machines in which great precision is required and which work with materials stiffer and thicker than paper. This class of machines is popularly known (though somewhat inaccurately) as ticket machines, because originally used for cutting and folding various forms of tickets. They are however used for many other forms of products which technically are still called tickets, such as the device illustrated in Figs. 18 and 19 of the accompanying drawing. These machines are in some ways different from paper folding machines of the more usual type dealing with paper folding that do not require so great exactness in the folding or cutting and are not compelled to deal with stiffer materials.

Figure 12:
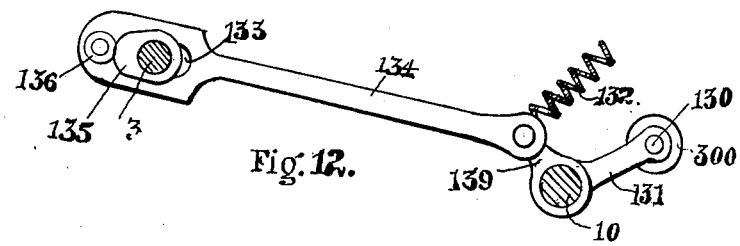
Figure 1:
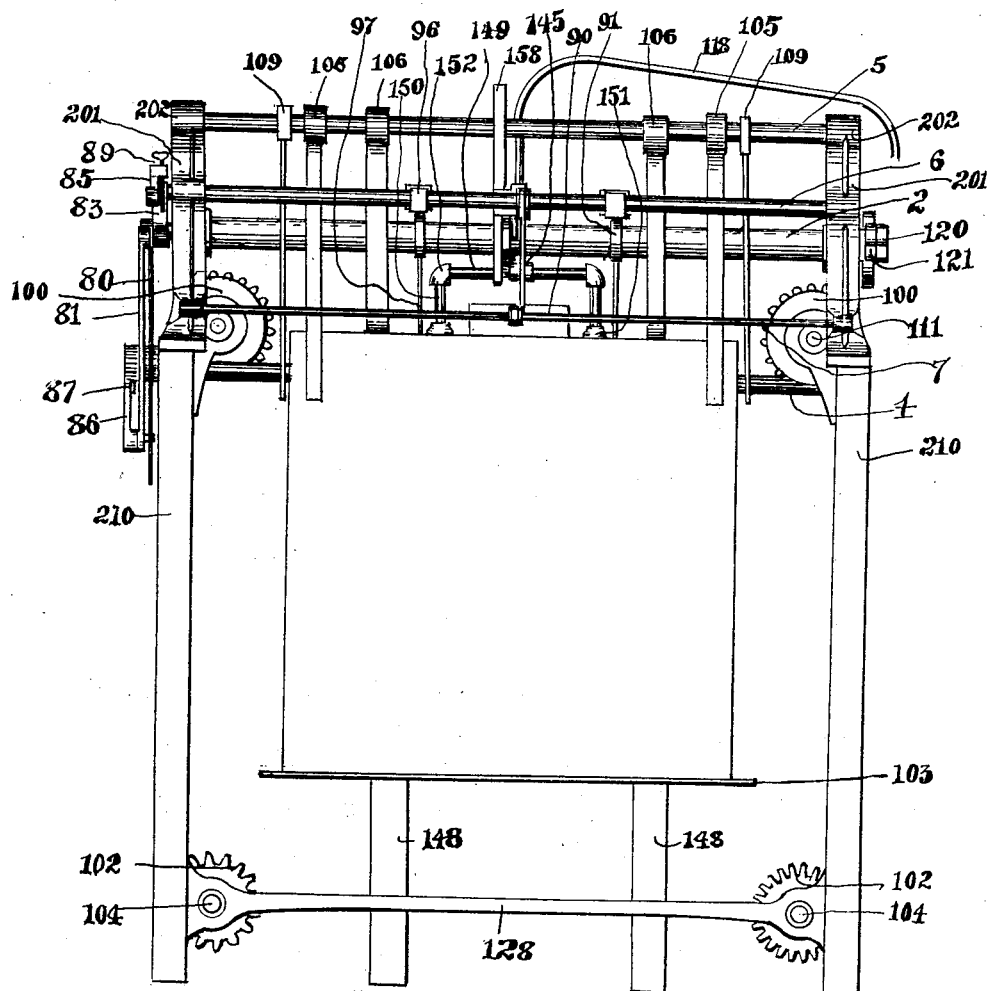
Figures 16, 19:
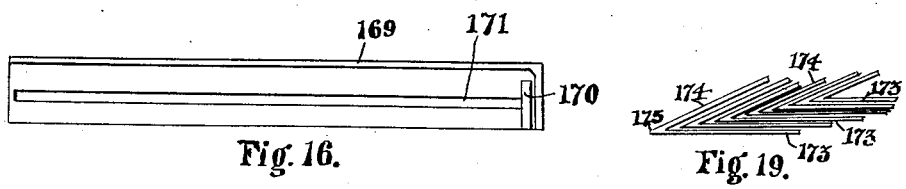
Figure 4:
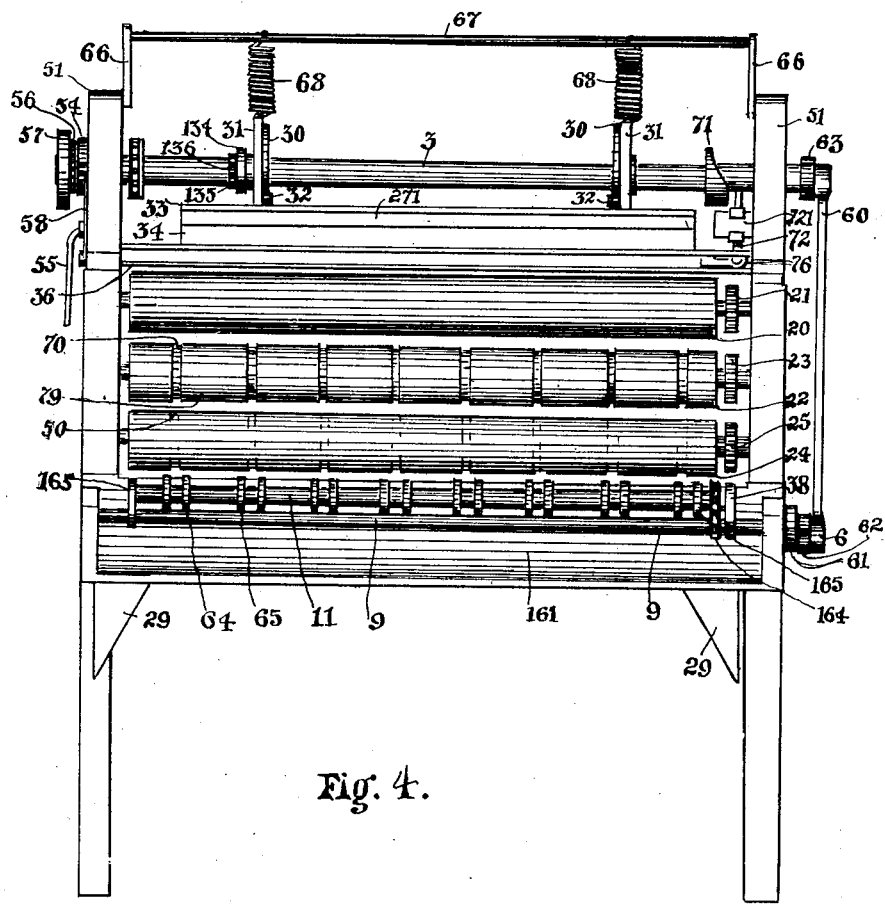
Figure 7:
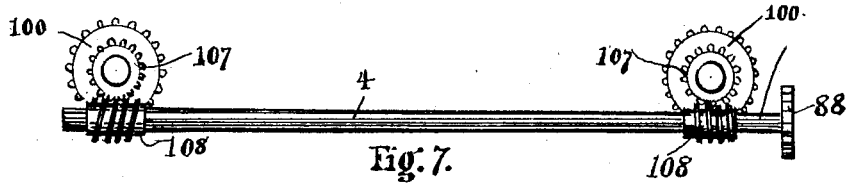
Figure 13:
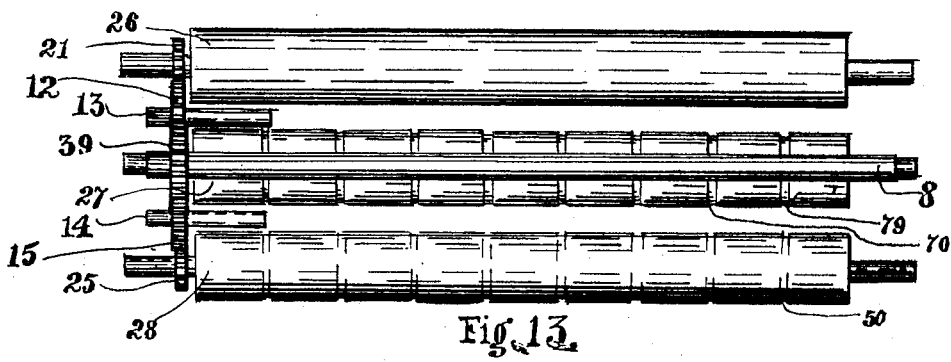
Figure 14:
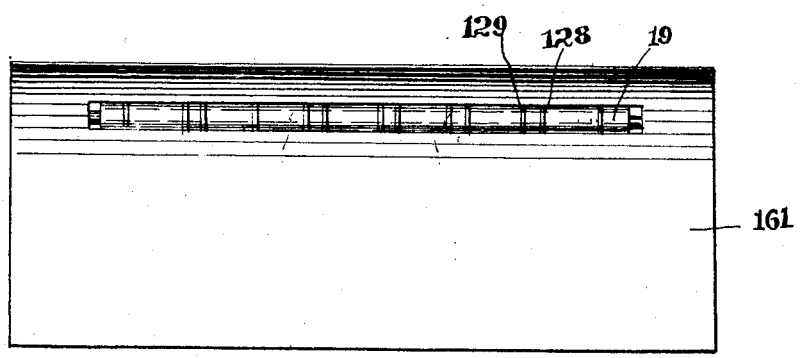
Figure 15:
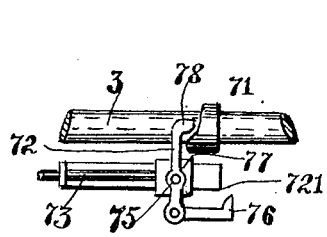
Figure 17:
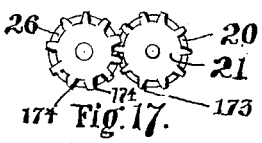

Figure 1 is an elevation of the back of the machine. Fig. 2 is an elevation of the left side. Fig. 3 is an elevation of the right side.
Fig. 4 is an elevation of the front of the machine. Fig. 5 is a plan view of the machine. Fig. 6 is a sectional elevation on the line *x—x of* Fig. 5 looking toward the right side of the machine. Fig. 7 is a view of the mechanism for operating the card lifter. Fig. 8 is a view of the cams, wheels and levers at the left end of shaft 3. Fig. 9 is a view of a portion of the card feeding device. Figs. 10 and 11 are parts of the regulator for the card lifter. Fig. 12 is a part of the card conveyer. Fig. 13 is a view of the cutting stack from the front showing an actuating mechanism for the rolls. Fig. 14 is a view of the receiving guide. Fig. 15 is a view of the card evener. Fig. 16 is a view of the upper guide of the positor. Fig. 17 is a view of a gearing for driving the rollers of the cutting stack positively with each other. Fig. 18 is a view of a card and Fig. 19 is a view of a pack of tickets.

The machine, in its best form, has a card lifter that is automatically regulated, an automatic card feeder and an automatic card conveyer, a positor preferably positively acting, a folding knife, a cutting stack and a ticket deliverer. All of these are turned by automatic devices to keep exact time with each other, so that the cards are placed in stack and kept at a constant level, and are fed automatically to the conveyers, carried by them to the positors which place them accurately in the exact place requisite below the folding knife. This in turn folds and delivers the cards to a stack of rollers, certain of which hold the folded card in exact place required, others cut it and others deliver the folded and cut tickets to the receiving guides. These rollers could also aid in maintaining the cutters exactly on the line of separation between the tickets.

The machine operates upon a card which is printed with the matter for a number of tickets, which are to be folded and cut automatically by the machine, and automatically delivered by it in separate packs of tickets, folded one ticket within the other, so that a suitable quantity of the packed tickets can be taken from the receiving guide by the attendant and be placed without any handling in the packing box.

This operation requires that large numbers of the tickets should be delivered from the machine, folded one within the other, often 100 or more. Each of these tickets has substantial thickness and is usually of smooth faced material. To pass more than a very few of them at most, folded, simultaneously through the cutters would be impossible, especially because of the extreme uniformity of the cutting of every ticket always required in this class of work. The cards must therefore, after being folded, be passed either in very thin layers or individually through the cutter rolls and the tickets assembled by the machine after the cards are cut, into packs of much larger numbers sufficient to fill a box so that the attendant has simply to fill the feeding table and remove the packs to the boxes, all other work being performed automatically by the machine.

The cards are placed in a pile on the shelf 103. This shelf is supported (see Fig. 2) by chains, 404, 404, extending over wheels 100, 100, 102, 102, which are actuated by mechanism regulated by the height of the top of the pile of cards. At the sides of this pile are guides, 148, 148. The guides 109, 109, extend at the ends of the pile. The guides 105, 105, lie at the side of the pile and the guides 106, 106, lie above the pile. The guides 105, 106 and 109 are most conveniently carried by a rod 5, set in the head 202 of the standards 201. This pile of cards occupies a space above the shelf 103 and for convenience in understanding the device is inclosed by the lines extending above the shelf.

The feeder delivers the cards to the conveyer. The feeder has a lifter that catches a card and removes it from the pile and places it in the conveyer. The suckers 151 are secured to pipes 150 which are connected by elbows 152, pipes 149, T 145 and pipe 153 to the chamber 144 which is connected by flexible pipe 118 to an exhaust. This exhaust is preferably arranged to produce a suction while the card is being lifted and delivered to the conveyer, and not to do so when the card has been delivered to the conveyer and the feeder is returning to its position over the pile of cards on shelf 103. This portion of the feeder is secured to the plunger 155, that moves in the guide 53, and is moved by the link 154 from the rocking shaft 2. In practice the link 154 is pivoted to cam 156 by the pivot 157. The plunger 158 is guided preferably by the walls of the slot 143 embracing the rod 5 and the shaft 2. Collars as 142, can be placed to hold it in position. The plunger carries the guide 53 and preferably the roller 159. It is raised by the spring 119 and depressed by the cam 156 which is operated by the rocking shaft 2. The shaft 2 will, therefore, lift and lower the plunger 158 and protract and retract the plunger 155 and hence make the suckers 151, 151, describe the arc of a circle; at one end of this arc resting upon the pile of cards and at the other delivering a card to the conveyers. A separator for the cards is provided so that the lifter will not lift more than a single card, consisting of catches 98, 98, holding the edge of the card, and of a depressor 90, between which and the catches 98, (see especially Fig. 5) the suckers will grip the card and will bow it upward and pull it out without pulling out the one next below it, from the catches 98, 98. The catches 98, 98, may conveniently be mounted on the bar 99. The depressor 90, may be arranged to be lifted off the card as it is being carried to the conveyer. In practice this is done by lifting it from the pile lifting and regulating devices. The wheels 100, 100, are mounted on a spindle 111, which is rotated by worm gearing from the shaft 4 (see particularly Fig. 7). 108 is a worm carrying sleeve; 107 is a gear wheel with which the worm meshes which is secured to the spindle 111. On the shaft 4 is the ratchet 88. The shaft 4 is turned and the shelf 103 is lifted as the cards are removed from the top of the pile on the shelf 103. A pawl 87 engaging with the ratchet wheel 88, the motion of which is directed through a series of links and arms from the movable stops 97 resting on the top of the pile of cards turns the shaft 4. The movable stops (see particularly Fig. 10) are in the form of rods secured to the arm 95 which is lifted by the cam 91 on the shaft 2. When not lifted by the cam the rods 97 rest on the pile of cards preferably near the suckers 151. The arm 95 is secured to the shaft 6, which is rocked by it either wholly or partly. This shaft 6 carries the arm 83 that is connected pivotally by the link 81 with the cam 86 that carries the pawl 87. This arm 86 is pulled upward (see Fig. 3) by the spring 82, which is the direct means of rotating the shaft 4. The arm 882 on the rocking shaft 2 carrying the link 84 having a slot 141 engaging with the pin 140 connecting the link 81 and arm 87 will serve if desired as an additional means of securing the movement of the ratchet wheel 88. It can be dispensed with or can replace the cams 91. The position of arm 83 can be rendered adjustable by having it fit loosely on the shaft 6 and providing an arm 166 secured to this shaft. A tension spring 881 draws the arm 83 toward the arm 166 and a set screw 89 spaces them apart. A small standard 85 bent over the arm 83 serves very conveniently to carry the spring 881. The depressor 90 can be lifted very readily by the arm 92 turning on the rod 7. This arm 92 can be lifted by a link 94 attached to arm 93 that is secured to shaft 6 (see Fig. 10). The pins 97 can be adjusted in head 96 by the set screw 167.

The conveyer has a series of shafts 16, 17, 18, provided with friction rollers 125, 126, 127, over and by which the cards are carried. Opposite the rollers 125 are the rollers 300 carried by the shaft 130. Opposite the rollers 126 are the rollers 44 and opposite the rollers 127, are the rollers 168. The shaft 130, is carried from the rocker shaft 10 by the arms 131, 131, and the rollers carried by it are pressed against the rollers on shaft 16 by the rocking of the shaft 10. The rollers 44 and 168 are pressed against the rollers 126 and 127 yieldingly and continuously. A very convenient way of doing this is to mount each pair of rollers 44, 168, at the ends of the swiveler 43, which is pressed down by the spring 42 and positioned by the stud 40. The stud and spring are very conveniently carried by the bar 41 which is supported by standards 45. The shafts 16, 17 and 18, are positively driven. A series of sprocket wheels 110, 113 and 119, can be connected to the main shaft 1 by such suitable chain drives as may be desired. The guides 47 and 48 help to carry the cards between the wheels of the conveyer and very conveniently may be connected to cross bars 46 and 49. The driven shafts 16, 17 and 18 are preferably carried on an inner frame having side pieces 112, 112, in which these shafts are journaled.

The positor, the device that places the card in the desired location beneath the folding knife, has a guide into which the card is pushed by the conveyer and an end stop, limiting its forward movement. The card should lie, preferably, so that the width of the part of the card between the slot and rear stop and the width of the part of the card on the side of slot away from the end stop are unequal. The positor should also adjust the card accurately laterally, and is provided with a side stop against which it is pushed by an adjuster. The table 36, over which the card is pushed is provided with an upper guide 35. This guide is formed (see Fig. 16) of the plate 35 with the flanges 169 and 170 (see Fig. 16) which rest on the table 36. The card is pushed until its end rests at the inner wall of flange 169. From the table extends the guide 37, and guides 122 are attached to a cross piece 123. The side adjuster (see Figs. 4 and 15) has a pivoted arm 76 the head of which pushes against the card and pushes it against the side stop 170. This arm is driven from the cam 71 by the lever 72, which is fulcrumed by pivot 75 to the slide 77; the arms of which inclose the guide 721. The head 78 of lever 72 rests against cam 71 which is carried by the revolving shaft 3. The location of the slide 77 on guide 721 can be regulated by the rod 73. The folding knife is driven positively downward. It passes through slot 171 in the guide 35 and slot 172 in table 36. It is carried by plungers 31, 31, that have slots embracing the shaft 3. These plungers 31 are lifted by the spring 68 and driven down by the cams 30, that work on the idlers 32 on the plungers 31. A knife holder 33, provided with the lugs 271 is attached to the plunger 31, 31 and holds the knife 34. The slots 171, 172 are placed at the distance from the flange 169 corresponding to the length desired for the folded part of the ticket. The walls of this slot 172 in the table 36 coöperate with the knife 34 to produce the fold and the width of this slot is regulated accordingly. The slot 171 very conveniently forms a guide for the folding knife.

The folding and cutting roller stack consists of a pair of receiving rollers 20, 26, a pair of cutting rollers following them, 22, 27, and a pair of holding and delivering rollers 24, 28 for the tickets into which the card has been cut by the cutting rollers 22, 27. These rollers are journaled in sliding journal boxes, 230, 231, 232, 233, 234, 235. The springs 900 press these boxes and hence the rollers of each pair toward each other, giving an elastic grip upon the card and tickets. One side of the stack is positively driven and the other side may be frictionally driven as indicated in Fig. 4, but the best results are obtained when both sides are positively driven, as indicated in Fig. 17. The teeth 173, 174, (see Fig. 17) will not be separated sufficiently to make the slip between the rollers important as the card or ticket separates them. The first or receiving rollers 20, 26, have in practice milled surfaces, in order to grip firmly the folded card, and they and the folding knife 34 are so placed that the folded card will be positively delivered squarely into the bite of the rollers 20, 26. The second or cutting rollers have in practice milled holding surfaces 79, and cutting edges 70 which coacting with each other, separate the folded card into tickets. The third or delivery rollers, 24, 28, are also preferably milled surfaced with depressed annular channels 50. These channels are placed to avoid contact between the cut edges of the tickets and the rollers. The pairs of rollers are preferably arranged so that two pairs will always bite upon the ticket at the same time.

The guide 161 is placed at the delivery end of the roller stack. The ticket packer is placed to receive each batch of tickets delivered to the guide by the delivery rollers of the stack. The intermittently moving rollers 11 and 19 receive between them each ticket and push it individually into the fold of the ticket preceding it; the tickets already packed are left with the upper leaf free to spring upward and hence each successive ticket is readily packed with its folded edge between the leaves of its predecessors; the roller 19, in practice, protrudes through a slot in the guide 161 (see Fig. 14 particularly) and is provided with sets of annular projections 128, 129 preferably placed to engage each ticket near its opposite sides. The roller 11 also carries sets of annular projections, 64, 65 opposite to and resting against the projections 128, 129. The roller 11 is yieldingly actuated toward the roller 19. In practice it is journaled in the arms, 165, 165, and chain driven through the sprocket wheels 164 and 38. The shaft 9 in practice carries the arms, 165, 165, and the sprocket wheel 164. This shaft 9 is driven by a pawl and ratchet mechanism from the rotating shaft 3.

The box 115 is continually exhausted of its air by the pipe 117; it is connected to the flexible tube 118, the valve 116 has a valve seat on a port leading into the box 115 and is operated from the rotating shaft 3 by the cam 54, lever 58 and link 55. When the valve 116 is lifted from its seat no suction is transmitted to the suckers 151.

The driving of the various intermittently moving parts of this machine is positive in order to secure its proper timing. In practice I use a main shaft 1, from which the various instrumentalities described above are mediately or immediately driven. The continuously rotating parts are driven from the shaft 1 preferably by chains or gears and a continuously rotating shaft is selected, in practice the shaft 3, from which the intermittently moving parts are directly or indirectly driven or regulated.

The shaft 3 drives the rock shaft 2 by the link 120 which connects the arm 121 with the disk 57. From the rock shaft 2, the feeding device, the card lifter and card feeders are driven. The cams 91, 91, and the cam 156 being set on shaft 2 relatively to each other so that the cams 91, 91 raise the arms 95, 95, while the card feeder is lifting the card from its stack and putting it in the conveyer. The roller shaft 130 is driven from shaft 3 by the cam 135, which conveniently works on the pulley 136 on the link 134, the walls of the slot 133 in which, inclose the shaft 3. This link is connected to the arm 139 that rocks the rock shaft 10. This shaft is rocked against the cam 135 by the spring 132, which makes the bite of the parts 125 and 300 elastic and yielding. The cam 135 is set relatively to the pinion 147 on the disk 57 so that the roller shaft 130 will be lifted from the roller shaft 16 while the feeder is placing a card above it. The shape of the cam 135 and the speed of the rollers 16, 17 and 18 are regulated so that the card will be bitten and conveyed by the conveyer to the table 36 before the knife 34 is driven down by the cam 30. The positor is arranged so that the card will be pushed into position against the stopping flanges 169 and 170 before the knife 34 reaches the card. The setting of the cams 135, 30 and 71 relatively to each other on the shaft 3 is such as to make their actions follow at the required intervals. The cam 56 that controls the suction is set on shaft 3, so that the valve 116 is closed when the suckers 151 are lifting the card and opened at other times. The shaft 9 is driven by means of the ratchet 61 and pawl 64 attached to the rocker arm 62. The arm 63 secured to the shaft 3 drives the arm 62 through the link 60. The angular position of the arm 63 on the shaft 3 should be arranged so that the circumferential speed of the rings 65 will, at the time the tickets reach them from the rollers be equal to the circumferential speed of the rollers. It can advantageously increase momentarily after biting the tickets and quickly decrease in speed.

The rollers of the folding and cutting stack are all driven by gearing from a shaft 8 in order to give them each the same angular velocity. (See Figs. 4 and 13.)

The shaft 8 is provided with gear wheel 39 that meshes with the gear wheel 23 which meshes with gear wheels 12 and 15 on the idler shafts 13 and 14 which mesh with the gear wheels 21 and 25. The shaft 8 is driven from shaft 1 in any convenient manner. The frame work of the machine is unimportant; legs 210, 212 support cross pieces 213, 214. The goose neck standards 201 with the head 202 form a convenient means for supporting the rock shafts and rods required for the card lifter and feeder and other mechanism collected at the back of the machine.

The operation of the machine is as follows: The cards are placed in a pile on the shelf 103 and the shelf raised until the top card lies substantially on the feeding level; the machine is started and the card feeding device lifts the cards singly from the pile and drops them into the conveyer which conveys them to the positor, where each card is placed exactly in position for the folding knife to engage precisely on the desired line, the pushing stroke of this knife drives the card through the slot 172 in the table 36, folding it as it does so and pushes it folded, first, into the bite of the rollers, 20, 26, whence it passes between the cutting rollers 22, 27, where it is cut along the lines 176, 176, see Fig. 8, separating the card 177, 177 into the tickets 178, 178, which it passes on to the delivery rollers 24 and 28, which push them out upon the guide 161. These tickets are then seized by the bite of the rollers 11 and 19. These rollers push the tickets into the packs that gradually move over the guide 161, until the pack is big enough to be taken up by the operator and put into a box. The form of the pack is illustrated in Fig. 19. The tickets 178 have the long side 173 resting on the table, the short fold 174 lying upward. The space between the upper and lower fold of each ticket receives the nose 175 of the following ticket and if desired, a strip 179 can be cut off at each end of the card and discharged through chute 39.

I claim—

1. In a machine for folding cards and cutting the folded cards into tickets, the combination with a card feeding device, a conveyer, a positor provided with an end stop, a side stop and a side adjuster, a folding knife, a folding and cutting stack, a ticket packing device having its ticket pushing mechanism located to be free from the upper of the leaves of all the tickets previously packed and driving forward separately each batch of tickets delivered by the folding and cutting stack and pushing each ticket individually into the fold of the ticket preceding it.

2. In a machine for folding cards and cutting the folded cards into tickets, the combination with a feeding device, of a series of positively driven conveying rollers, a series of tensionally mounted opposing rollers, a positing device having upper and lower guides for the card, an end stop, a side stop and a side adjuster, a folding knife, a folding and cutting stack and a packer consisting of a pair of packing rolls and a platform for receiving the tickets nearly coincident near the roller with the plane forming a common tangent to the packing rollers.

3. In a machine for folding cards and cutting the folded cards into tickets, the combination with a feeding device, a positively acting conveyer, a positor provided with an end stop, a side stop and a side adjuster, a folding knife, a cutting roller stack having a pair of receiving rollers, a pair of cutter rollers having card gripping surfaces and annular cutters and a pair of delivery rollers, and a ticket packing device having a platform for the tickets and pushing each ticket individually into the fold of the ticket preceding it.

4. In a machine for folding cards and cutting the folded cards into tickets, in combination with a feeding device, a positively acting card conveyer, a positor provided with an end stop, a side stop and a side adjuster, a folding knife, a cutting roller stack having a pair of receiving rollers, a pair of cutter rollers, that have card gripping surfaces and annular cutters and a pair of packing rollers, of a ticket packing device acting upon the tickets individually after they have passed through the folding and cutting stack, and having a curved guide for the tickets to which the plane forming a common tangent to the packing rollers is substantially tangent.

5. In a machine for folding cards and cutting them into tickets, the combination of a card conveyer, the slotted table to receive the card to be folded and cut, a positor having an end stop for the card, the distance between the slot and the end stop being unequal to the half of the card, a side stop and a positively acting side adjuster bringing the side card against the stop, a stack of rollers containing a pair of feed rollers and a pair of cutter rollers, having annular knives, a curved receiving guide for the tickets at the discharge end of the stack and an intermittently acting packing roller, placed at a distance from the discharge end of the stack substantially equal to the length of the card and timed to begin its movement simultaneously with the delivery to it of the card from the folding and cutting stack.

6. In a machine for folding cards and cutting the folded cards into tickets, the combination with the positively acting card feeding device, the positor having an end stop, a side stop and a side adjuster, and the folding knife of a stack of folding and cutting rollers, having a pair of receiving rollers with frictional rolling surfaces, a pair of cutting rollers with frictional roller surfaces and annular cutters, the frictional roller surfaces holding the folded card elastically while being cut by the annular cutters and a pair of delivery rollers and a packing device receiving the tickets individually and pushing each ticket into the fold of the ticket preceding it.

7. In a machine for folding cards and cutting the folded cards into tickets, the combination with the positively acting card feeding device, the positor having an end stop, a side stop and a side adjuster, and the folding knife of a stack of folding and cutting rollers, having a pair of receiving rollers with frictional rolling surfaces, a pair of cutting rollers with frictional roller surfaces and annular cutters, the frictional roller surfaces holding the folded card elastically while being cut by the annular cutters, and a pair of delivery rollers, the rollers of each pair being yieldingly impelled toward each other and a packing device receiving the tickets individually and pushing each ticket into the fold of the ticket preceding it.

8. In a machine for folding cards and cutting the folded cards into tickets, the combination with the positively acting card feeding device, the positor having an end stop, a side stop and a side adjuster, and the folding knife, of a stack of folding and cutting rollers, having a pair of receiving rollers with frictional rolling surfaces, a pair of cutting rollers with frictional roller surfaces and annular cutters, the frictional roller surfaces holding the folded card elastically while being cut by the annular cutters and a pair of delivery rollers, each pair of rollers being set nearer to the next pair than the width of the card and a packing device receiving the tickets individually and pushing each ticket into the fold of the ticket preceding it.

9. In a cutting and folding machine for tickets in combination with a cutting and folding roller stack, of a pair of intermittently operated rollers, and a ticket guide running to the bite of the packing rollers at their discharge side and receiving the tickets as discharged.

10. In a cutting and folding machine for tickets in combination with a cutting and folding roller stack, of a pair of intermittently operated rollers, a ticket guide running to the bite of the packing rollers at their discharge side and receiving the tickets as discharged, a positor for the tickets and a folding knife positively actuated toward the roller stack.

11. In a cutting and folding machine for tickets in combination with a cutting and folding roller stack, of a pair of intermittently operated rollers, a ticket guide running to the bite of the packing rollers at their discharge side and receiving the tickets as discharged, a positor, card conveyers conveying the cards to the positor, a folding knife positively driven toward the said cards and bending and forcing the same into the bite of the said cutting and folding roller stack, said knife being timed to act upon each card individualy after the same has been brought to the positor.

12. In a cutting and folding machine for tickets in combination with a cutting and folding roller stack, of a pair of intermittently operated rollers, a ticket guide running to the bite of the packing rollers at their discharge side and receiving the tickets as discharged, a positor, a card conveyer, a folding knife driven positively downward toward the bite of the roller stack, said positor having a slot therein parallel with and above the bite of the folding stack, the walls of said slot being sufficiently close together and lying in the path of the motion of the folding knife so that a fold will be produced in the card by the passage of the knife through the slot.

In testimony whereof I affix my signature.

CHARLES GUTBERLET.